United States Patent
Levin et al.

(10) Patent No.: US 8,820,052 B2
(45) Date of Patent: Sep. 2, 2014

(54) LIQUID REDUCTANT SYSTEM AND METHOD FOR OPERATION OF THE LIQUID REDUCTANT SYSTEM

(75) Inventors: Michael Levin, Ann Arbor, MI (US); Furqan Zafar Shaikh, Troy, MI (US); Thomas A. McCarthy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 13/419,951

(22) Filed: Mar. 14, 2012

(65) Prior Publication Data
US 2013/0205756 A1  Aug. 15, 2013

Related U.S. Application Data

(60) Provisional application No. 61/596,846, filed on Feb. 9, 2012.

(51) Int. Cl.
*F01N 3/00* (2006.01)
(52) U.S. Cl.
USPC ............... 60/286; 60/274; 60/295; 60/301; 60/303
(58) Field of Classification Search
USPC ............ 60/274, 286, 295, 298, 301, 303, 320
See application file for complete search history.

(56) References Cited

U.S. PATENT DOCUMENTS

| | | | |
|---|---|---|---|
| 6,295,809 B1 | 10/2001 | Hammerle et al. | |
| 6,679,200 B2 | 1/2004 | Dingle | |
| 7,143,727 B1 | 12/2006 | Winstead et al. | |
| 7,302,795 B2* | 12/2007 | Vetrovec | 60/309 |
| 7,370,609 B2* | 5/2008 | Kamio | 123/1 A |
| 7,587,890 B2 | 9/2009 | Stroia et al. | |
| 7,788,905 B2* | 9/2010 | Ueda et al. | 60/286 |
| 7,943,101 B2* | 5/2011 | Osaku et al. | 422/547 |
| 7,971,426 B2 | 7/2011 | Van Nieuwstadt | |
| 8,122,710 B2* | 2/2012 | Schmale et al. | 60/286 |
| 8,361,422 B2* | 1/2013 | Soukhojak et al. | 423/212 |
| 8,459,015 B1* | 6/2013 | Coletta | 60/309 |
| 2001/0023586 A1 | 9/2001 | Hammerle et al. | |

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

A liquid reductant injection system is provided. The liquid reductant injection system includes a storage tank housing a reductant solution, a return conduit extending into the storage tank, the return conduit including an outlet positioned in the storage tank, and a thermosyphon comprising an evaporator coupled to an exhaust conduit and in fluidic communication with a condenser coupled to a portion of the return conduit inside the storage tank, the condenser positioned vertically above the evaporator.

21 Claims, 4 Drawing Sheets ively, engine 150 may include other types of engines such as gasoline burning engines, among others. The exhaust system 100 and the engine 150 are included in a vehicle 190.

LIQUID REDUCTANT SYSTEM AND METHOD FOR OPERATION OF THE LIQUID REDUCTANT SYSTEM

CROSS REFERENCE TO RELATED APPLICATION

The present application claims the benefit of and priority to U.S. Provisional Patent Application No. 61/596,846, filed on Feb. 9, 2012, entitled LIQUID REDUCTANT SYSTEM AND METHOD FOR OPERATION OF THE LIQUID REDUCTANT SYSTEM, the content of which is incorporated herein by reference for all purposes.

TECHNICAL FIELD

The present application relates to a system and a method for heating a reductant solution in a storage tank of an exhaust treatment system of a vehicle.

BACKGROUND AND SUMMARY

Many vehicles utilize catalysts in exhaust systems to reduce emission. In lean exhaust conditions, such as with regard to diesel exhaust or other lean burning conditions, a catalyst may utilize reductant other than burnt fuel. One such aftertreatment device is a Selective Catalytic Reduction (SCR) system, which uses a catalyst to convert NOx to nitrogen and water. A urea-based SCR catalyst may use gaseous ammonia as the active NOx reducing agent, in which case an aqueous solution of urea may be carried on board of a vehicle, and an injection system may be used to supply it into the exhaust gas stream.

At ambient temperatures of less than −11° C., the aqueous urea solution (comprising 32.5% urea and 67.5% water) may freeze in the on board urea storage tank. Thus, a pick-up tube of the injection system may not be able to deliver urea to the injector for delivery to exhaust gas and NOx reduction. In one approach, the urea storage tank includes an electric heating system to warm the frozen urea. Further, components of the urea storage tank and reductant injection system may have a freeze-safe design to assure functionality and survivability of the injection system over multiple freeze/thaw cycles.

The inventors of the present application have recognized a problem in the above solutions. First, there may be increased cost associated with the heating and freeze-safe components for the urea storage tank and reductant injection system. Second, fuel economy may be decreased by using energy produced by the vehicle to heat the entire urea tank, and such heating may take an extended duration, thus reducing the amount of exhaust gasses that can be treated catalytically with the reductant, and thus increasing exhaust emissions overall.

Accordingly, in one example, some of the above issues may be addressed by a liquid reductant injection system. The liquid reductant injection system includes a storage tank housing a reductant solution, a return conduit extending into the storage tank, the return conduit including an outlet positioned in the storage tank, and a thermosyphon comprising an evaporator coupled to an exhaust conduit and in fluidic communication with a condenser coupled to the return conduit inside the storage tank, the condenser positioned vertically above the evaporator.

In this way, waste heat from the exhaust system can be used to passively heat the reductant solution in the storage tank via the thermosyphon. In some examples, the thermosyphon is a closed-loop thermosyphon. Thus, in such an example, the thermosyphon does not need an outside power source or controller to operate although such components could be used, if desired. As a result, the reductant solution is heated without decreasing the fuel economy by using energy produced by combustion to heat the storage tank.

Additionally, in some examples the reductant solution may include ethanol. By including ethanol in the reductant solution, a freezing point temperature of the liquid reductant may be reduced. As such, the occurrences of reductant freezing may be reduced and/or the size and/or operating temperature range at which thermosyphon functions can be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments of an exhaust system and a liquid reductant injection system for use with an aqueous urea and ethanol solution are disclosed herein. Such a liquid reductant injection system may be utilized for exhaust gas treatment by NOx reduction in various ambient temperature conditions. More specifically, the reductant injection system may be used to treat exhaust gas in ambient temperatures below a normal freezing temperature of aqueous urea. In particular, the reductant injection system may include a thermosyphon which passively transfers heat from exhaust gas to stored reductant, as described in more detail hereafter. Consequently, the reductant solution is heated without decreasing the fuel economy by using energy produced by combustion to heat the storage tank.

Figure 1:
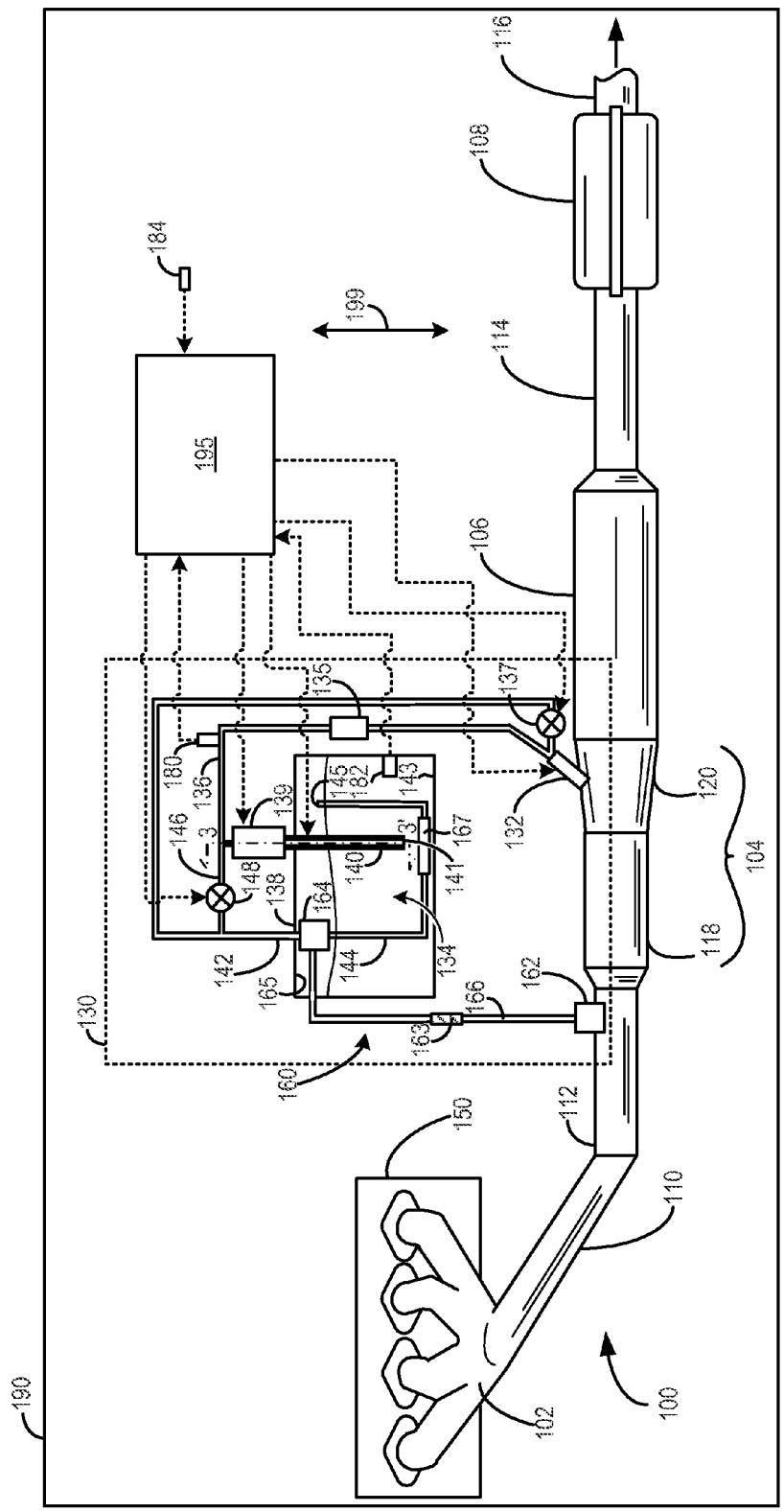
FIG. 1 illustrates an example exhaust system for receiving and treating engine exhaust gas and including a liquid reductant system.
Figure 2:
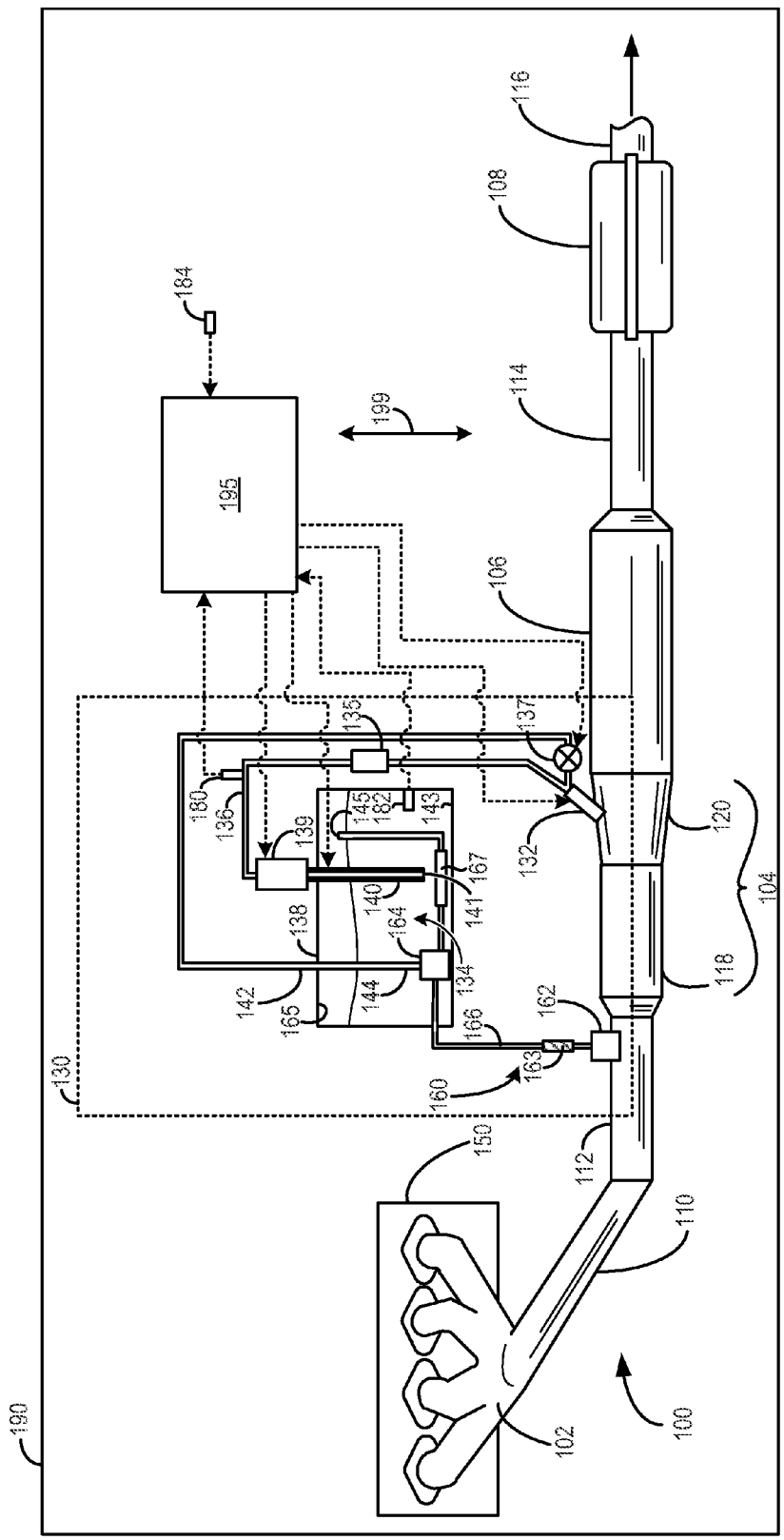
FIG. 2 illustrates another example exhaust system including a liquid reductant injection system.
Figure 3:
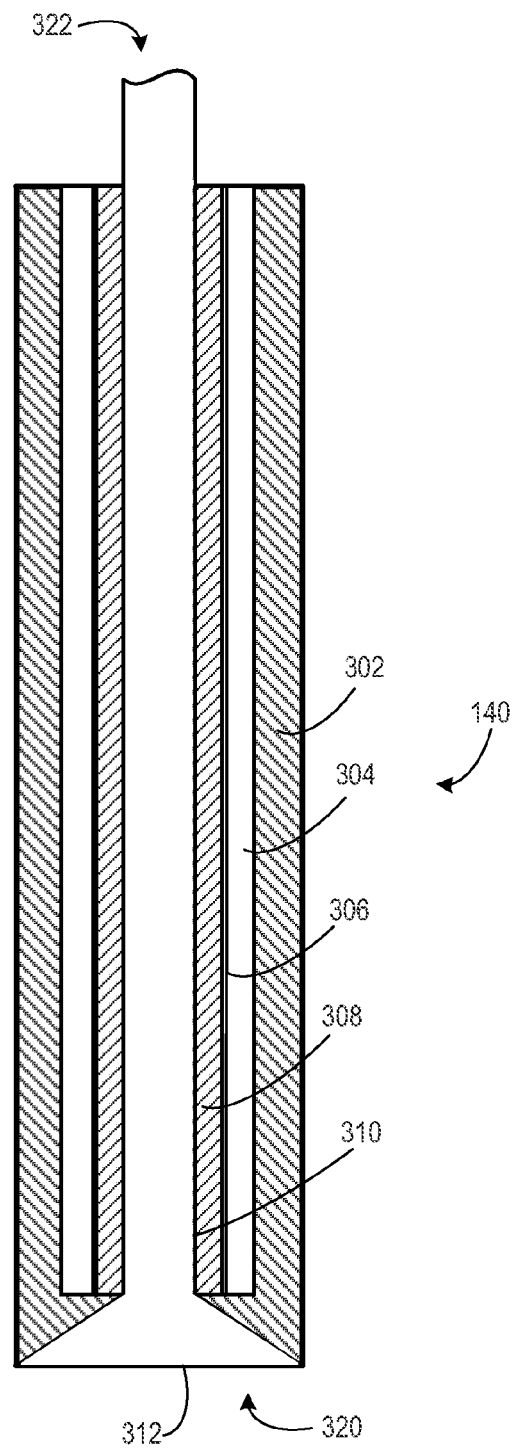
FIG. 3 illustrates a cross-section of an example pick-up tube of the liquid reductant injection system of FIG. 2.
Figure 4:
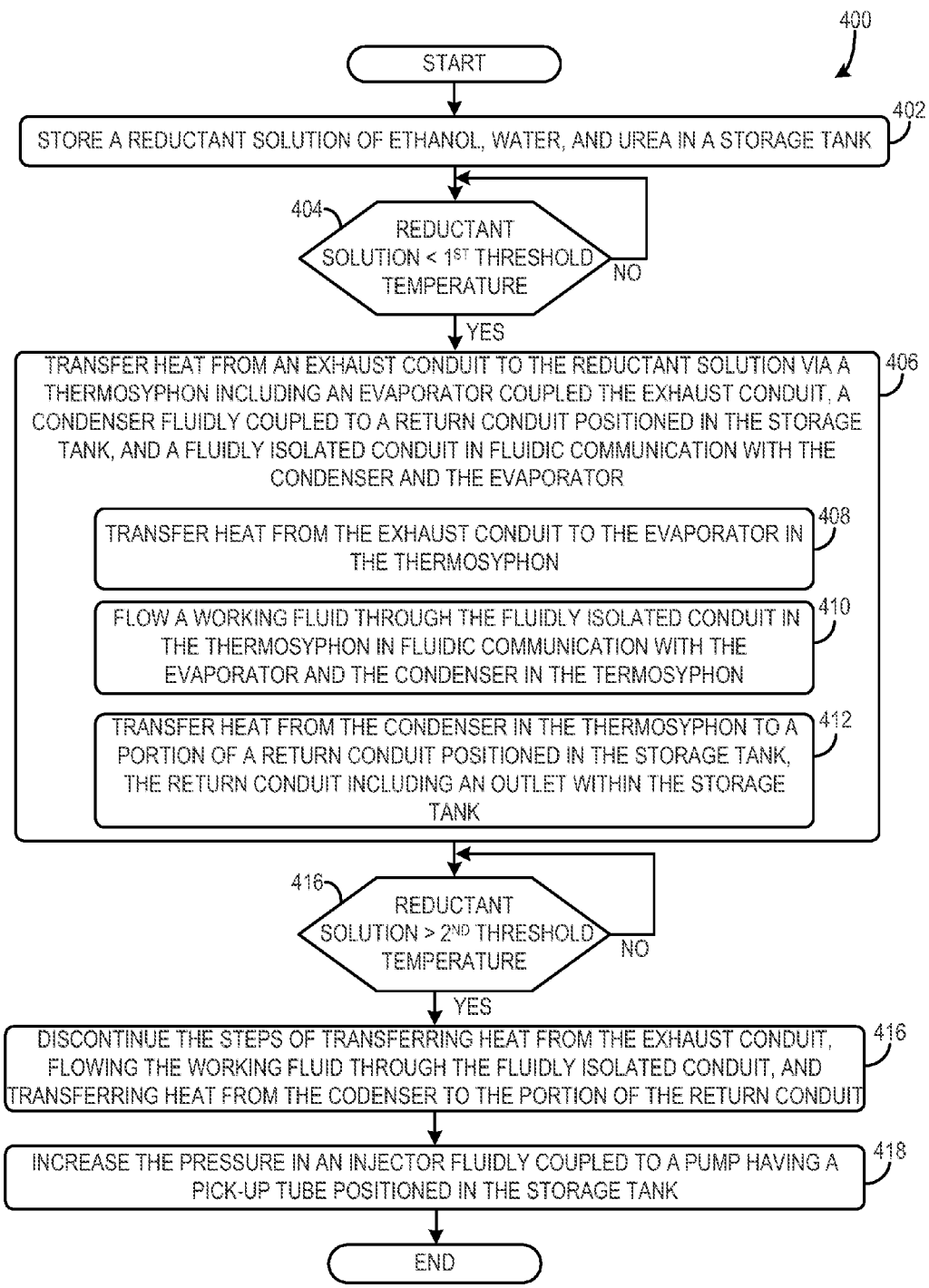
FIG. 4 is a flow chart of an example method for operating the reductant injection system of FIG. 2.

FIG. 1 includes an example exhaust system for a vehicle with an engine including a reductant injection system. FIG. 2 shows another embodiment of an exhaust system. FIG. 3 shows a cross section of a heated pick-up tube along the 3-3' axis of FIG. 1. FIG. 4 includes a flow chart of an example method for operating a reductant injection system.

More specifically, FIG. 1 illustrates an exhaust system 100 for transporting exhaust gases produced by internal combustion engine 150. As one non-limiting example, engine 150 includes a diesel engine that produces a mechanical output by combusting a mixture of air and diesel fuel. Alternatively, engine 150 may include other types of engines such as gasoline burning engines, among others. The exhaust system 100 and the engine 150 are included in a vehicle 190.

Exhaust system 100 may include one or more of the following: an exhaust manifold 102 for receiving exhaust gases produced by one or more cylinders of engine 150, a mixing region 104 arranged downstream of exhaust manifold 102 for receiving a liquid reductant, a selective catalytic reductant (SCR) catalyst 106 arranged downstream of the mixing region 104, and a noise suppression device 108 arranged downstream of catalyst 106. Additionally, exhaust system 100 may include a plurality of exhaust pipes or passages for fluidically coupling the various exhaust system components. For example, as illustrated by FIG. 1, exhaust manifold 102 may be fluidically coupled to mixing region 104 by one or more of exhaust passages 110 and 112. Catalyst 106 may be fluidically coupled to noise suppression device 108 by exhaust passage 114. Finally, exhaust gases may be permitted to flow from noise suppression device 108 to the surrounding environment via exhaust passage 116. Note that while not illustrated by FIG. 1, exhaust system 100 may include a particulate filter and/or diesel oxidation catalyst arranged upstream or downstream of catalyst 106. Furthermore, it should be appreciated that exhaust system 100 may include two or more catalysts.

In some embodiments, mixing region 104 can include a greater cross-sectional area or flow area than upstream exhaust passage 112. Mixing region 104 may include a first portion 118 and a second portion 120. The first portion 118 of mixing region 104 may include an injector 132 for selectively injecting a liquid into the exhaust system 100. The second portion 120 of mixing region 104 may be configured to accommodate a change in cross-sectional area or flow area between the first portion 118 and the catalyst 106. Note that catalyst 106 can include any suitable catalyst for reducing NOx or other products of combustion resulting from the combustion of fuel by engine 150.

The injector 132 is a part of a liquid reductant injection system 130 included in the exhaust system 100. As one non-limiting example, the liquid injected by the injector 132 may include a liquid reductant solution 134, such as a urea solution. In one specific example, the liquid reductant solution comprises an aqueous urea and ethanol solution. More specifically, the liquid reductant may comprise an aqueous solution which is 32.5% urea, 25% ethanol, and 42.5% water. In some examples, the urea concentration in the liquid reductant solution may be higher than 32.5%. In such an example, the water content in the reductant solution may be correspondingly reduced. The increase in urea concentration may be achieved via the suppression of freezing of the solution by the ethanol content in the solution. However, when the liquid reductant solution does not contain ethanol, the eutectic solution of 32.5% produces the lowest freezing point of −11° C. The increase in urea concentration may be based on the need to achieve a predetermined freezing point of the solution that may drive the cost of the storage tank. A higher urea concentration in the liquid reductant solution may need a higher temperature to avoid precipitation of the urea.

As such, in this specific example, the freezing point of the liquid reductant is below −25° C. The urea in the aforementioned solution is fully dissolved in the water-ethanol solution at or above temperatures in the 0° C. to 10° C. range, depending on the urea content. However, when cooled below temperatures in the 0 C to −5° C. range, the urea may at least partially precipitate out of solution, as urea precipitate. In one example, the urea precipitate may settle at the bottom one third to the bottom one quarter of a storage tank 138 housing the reductant solution 134. The example aqueous urea and ethanol solution, described above, has the advantage it does not freeze at −11° C. (the normal freezing temperature for a urea and water solution), and instead freezes at a decreased temperature of approximately temperatures below −25° C.

The liquid reductant solution 134 may be supplied to injector 132 through a conduit 136 from a storage tank 138 via a pump 139. The pump 139 may be configured to operate in both a forward and reverse direction. However in an alternate embodiment, the liquid reductant injection system 130 may include a second pump, which pumps liquid reductant in an opposite direction of the pump 139. The liquid reductant injection system 130 may be air-purged in reverse direction upon the engine shut-down by operating the pump 139 in a reverse direction. The pump 139 is coupled to the conduit 136 for transporting the liquid reductant solution 134 to the injector 132, where the liquid reductant is injected into the exhaust gas flow path (now shown) as a reductant spray.

The conduit 136 includes a filter 135 configured to remove unwanted particulates from the reductant solution traveling through the conduit 136 to the injector 132. The pump 139 includes a pick-up tube 140 extending towards a bottom 143 of the storage tank 138. The pick-up tube 140 includes an inlet 141 configured to receive reductant solution from the storage tank 138. The pick-up tube 140 may be heated in some examples and is described in greater detail herein with regard to FIG. 3.

The liquid reductant solution 134 may be returned to the storage tank 138 via a reductant return conduit 142. The reductant return conduit 142 includes an outlet 145 opening into the storage tank 138. A valve 137 is coupled to the return conduit 142. The valve 137 is configured to regulate the flow of reductant solution through the return conduit 142. In a closed position the valve 137 is configured to substantially inhibit the flow of reductant solution through the return conduit 142. On the other hand, in an open position the valve 137 is configured to enable reductant solution to flow through the return conduit 142. A portion 144 of the return conduit 142 is positioned within the storage tank 138. The return conduit 142 includes an outlet 145 positioned in the storage tank 138.

The liquid reductant injection system 130 may also include a bypass conduit 146. The bypass conduit 146 is in fluidic communication with the reductant return conduit 142 and the conduit 136. A valve 148 is coupled to the bypass conduit 146. The valve 148 is configured to adjust the flow of reductant solution through the bypass conduit 146. In a closed position the valve 148 is configured to substantially inhibit reductant solution flow through the bypass conduit 146. In an open position the valve 148 is configured to enable reductant solution to flow through the bypass conduit 146. Thus, the valve 148 is configured to regulate reductant flow through the bypass conduit 146.

A thermosyphon 160 is also included in the liquid reductant injection system 130. The thermosyphon 160 is configured to transfer heat from the exhaust system 100 to the reductant solution 134 in the storage tank 138. The thermosyphon 160 includes an evaporator 162 coupled to the exhaust conduit 112. However in other examples, the evaporator 162 may be coupled to the exhaust conduit 114 downstream of the SCR catalyst 106. It will be appreciated that when the evaporator 162 is positioned upstream of the SCR catalyst 106 a greater amount of heat may be transferred to the evaporator 162.

Thermosyphon 160 further includes a condenser 164 in fluidic communication with the evaporator 162 via a fluidly isolated conduit 166. Thus, thermosyphon 160 is a closed-loop thermosyphon. That is to say that the quantity of the working fluid in thermosyphon 160 and specifically the fluidly isolated conduit 166 remains substantially constant during operation of thermosyphon. In the thermosyphon, liquid reductant may return along the inner walls of conduit 166 assisted via gravity. However, in other embodiments the thermosyphon may utilize a fluidly isolated loop. The fluidly isolated loop may include a separate conduit which enables the working fluid from the condenser 164 to return to the evaporator 162 via gravity through a separate conduit. Further still in other embodiments, the thermosyphon may include a heat pipe in which gravity in conjunction with wicking is used to assist in flowing the working fluid from the condenser back to the evaporator. The design of the thermosyphon and selection of working fluid may control the start and stop temperatures of the heat transfer. The fluidly isolated conduit 166 may include a flexible portion 163 configured to increase and decrease the length of the fluidly isolated conduit 166 to accommodate for movement of the exhaust conduit 112.

The condenser 164 is coupled to the return conduit 142 at a location inside the storage tank 138. Specifically, in the depicted embodiment the condenser 164 is coupled to a portion of the return conduit 142 near a top 165 of the storage tank 138. However, in other embodiments, the condenser 164 may be spaced away from the return conduit 142 and positioned in the storage tank 138 so that at least a portion of the condenser is submerged in the reductant solution 134. In one example, the condenser 164 may be coupled to a housing of the storage tank 138.

The condenser 164 is configured to transfer heat from the working fluid in thermosyphon 160 to reductant solution in the return conduit 142 as well as in the storage tank 138. In this way, the temperature of the reductant solution can be increased, thereby dissolving the precipitated urea. The condenser 164 is positioned vertically above the evaporator 162 with regard to a gravitational axis 199. It will be appreciated that this configuration enables the working fluid heated via the evaporator 162 to flow upward through the fluidly isolated conduit 166 to the condenser 164. The vertical position of the evaporator 162 may be selected based on packaging constraints in the exhaust system 100. Thus, the condenser 164 may be positioned near the top 165 of the storage tank 138 to enable the condenser 164 to be positioned vertically above the evaporator 162. A finned tube 167 is included in the return conduit 142. The finned tube is positioned upstream of the outlet 145 and downstream of the location where the condenser is coupled to the return conduit. In the depicted embodiment, the outlet 145 is positioned near the top 165 of the storage tank 138 and specifically above the liquid reductant solution to entrain purge air on engine shutdown, when the pump 139 is rotating in reverse. However, in other examples, the outlet 145 may be positioned in another location. Additionally, the finned tube 167 is positioned adjacent to a bottom surface of the storage tank 138. However, other positioned have been contemplated. The finned tube 167 enables a greater amount of heat to be transferred from the return conduit to the reductant solution 134 in the storage tank 138.

The thermosyphon 160 may be configured to transfer heat from the exhaust conduit 112 to the reductant solution 134 when the temperature of the reductant solution falls below a lower threshold value. The lower threshold value may be selected to prevent precipitated urea from reaching pick-up tube inlet 141. In one example, the lower threshold value is approximately 0° Celsius. Additionally, the thermosyphon 160 may be configured to discontinue the transfer of heat from the exhaust conduit 112 to the reductant solution when the temperature of the reductant solution reaches and/or surpasses an upper threshold value. The upper threshold value may be selected to reduce the likelihood of the reductant solution 134 overheating. In this way, degradation of the reductant solution 134 may be avoided. In some examples, the upper threshold value is approximately 40° Celsius. It will be appreciated, that the size (e.g., length and/or diameter) of the fluidly isolated conduit 166 and the working fluid in thermosyphon 160 may be selected to enable thermosyphon 160 to transfer heat from the exhaust conduit to the reductant solution when the reductant solution 134 reaches a lower threshold temperature and to discontinue the transfer of heat from the exhaust conduit to the reductant solution when the temperature of the reductant solution reaches an upper threshold value. Thus, the thermosyphon 160 can be passively operated without an external power source or a controller. Further in some examples, the pump 139 and the valve 148 may be operated to circulate reductant solution through the return conduit 142 when the temperature of the reductant solution reaches a lower threshold value. It will be appreciated that the ambient temperature may be correlated to the temperature of the reductant solution. Moreover, the lower and upper threshold values are predetermined. The working fluid in the thermosyphon 160 may be water, ethanol, and/or acetone. The reductant injection system 130 further includes a pressure sensor 180 coupled to the conduit 136. In the present embodiment the pressure sensor is disposed between the pump 139 and the filter 135, proximal to the filter; however, in alternate embodiments the pressure sensor may be at a different location, such as a location between the filter 135 and the injector 132.

The reductant injection system 130 further includes a temperature sensor 182 positioned within the storage tank 138. Additionally, the exhaust system 100 may include an ambient temperature sensor 184.

A controller 195 is also included in the exhaust system 100. The controller 195 may be configured to control a number of components such as the injector 132, pump 139, valve 137, heated pick-up tube 140, and valve 148. Thus, the controller 195 may control the opening and closing of the valves (137 and 148) and the injector 132, the temperature of the heated pick-up tube 140, and the output of the pump 139. However, in other embodiments the valve 137 may be passively operated. For example, the valve 137 may be a check valve configured to open when the pressure in the injector 132 reaches a threshold pressure. Additionally, the controller 195 may include a power control module configured to deliver power to the injector 132, pump 139, valve 137, pick-up tube 140, and valve 148.

FIG. 2 shows another embodiment of the exhaust system 100 and specifically thermosyphon 160. The exhaust system 100 shown in FIG. 2 includes many of the same parts as the exhaust system shown in FIG. 1. Therefore similar parts are labeled accordingly. FIG. 2 shows the condenser 164 positioned in a lower portion of the storage tank 138. Specifically, the condenser 164 is adjacent to the bottom 143 of the storage tank 138. In some embodiments, the condenser 164 may be coupled to the bottom 143. Thus, the condenser 164 is submerged in the reductant solution, thereby enabling the condenser 164 to transfer heat directly to the reductant solution in the storage tank 138 as well as the reductant solution in the return conduit 142.

Note that with regards to vehicle applications, exhaust system 100 shown in FIGS. 1 and 2 may be arranged on the underside of the vehicle chassis. Additionally, it should be appreciated that the exhaust passage may include one or more bends or curves to accommodate a particular vehicle arrangement. Further still, it should be appreciated that in some embodiments, exhaust system 100 may include additional components not illustrated in FIGS. 1 and 2 and/or may omit components described herein.

Further, the liquid reductant injection system 130 shown in FIGS. 1 and 2 has another advantage in that at temperatures below a threshold, such as 0° C. to −5° C., the system may provide mechanism for dissolving urea precipitate that does not require heating of the storage tank. For this purpose, as depicted in FIGS. 1 and 2, the pump 139 includes pick-up tube 140. The pick-up tube 140 extends into the lower one third to one quarter of the storage tank 138. Urea precipitate may be located when the ambient temperature is less than the precipitation point of the liquid reductant. In the present embodiment, the pick-up tube 140 is a heated pick-up tube. One example configuration for a heated pick-up tube is shown in FIG. 3. However, in other embodiments the pick-up tube 140 may not be heated.

Specifically, FIG. 3 shows a cross section, drawn approximately to scale, of one example conformation for a heated pick-up tube along the 3-3' axis of the pick-up tube 140, depicted in FIG. 1. In this example, the pick-up tube 140 comprises an outer tube 302, an inner tube 308, and an inner cylindrical space 310, which is a space within the inner tube 308. The inner cylindrical space 310 has a conical opening 312 at a suction end 320, wherein the liquid reductant solution 134 may enter into the cylindrical space 310 via suction/negative pressure generated by the pump 139. In an alternate embodiment, pick-up tube may be cylindrical at the suction end and include a conical portion as a separate attached piece. An opposing end 322, opposite of the suction end 320, is coupled to the pump 139, as shown in FIGS. 1 and 2.

Returning to FIG. 3, an air gap 304 is disposed between the outer tube 302 and the inner tube 308, and a heat tape layer 306 is disposed on the outer surface of the inner tube 308. The heat tape layer 306 may include an electrical element connected to a power source of the vehicle to provide heat in the region of the inner tube 308. The air gap 304 may reduce heat loss via conduction of heat from the outer tube 302 to the storage tank 138, and may prevent the liquid reductant from coming into contact with the heat tape layer 306. Thus, in this example the air gap provides efficient use of electricity in heating of the pick-up tube, and protects the components of the heat tape from being degraded by the liquid reductant. In alternate embodiments, the pick-up tube 140 may have a different or additional heating mechanism, such as a coil type heater.

A method 400 for operating the liquid reductant injection system is shown in FIG. 4. The method 400 may be implemented via the systems and components described above with regard to FIGS. 1-3 or may be implemented via other suitable systems and components.

At 402 the method includes storing a reductant solution of ethanol, water, and urea in a storage tank. At 404 it is determined if the reductant solution is below a first threshold value. The temperature of the reductant solution may be ascertained via a temperature sensor coupled to the storage tank housing the reductant solution or may be ascertained via another temperature sensor such as an ambient temperature sensor. Furthermore, the first threshold value may be determined based on the freezing point of the reductant solution.

If it is determined that the reductant solution is not below the first threshold value (NO at 404) the method returns to 404. However, if it is determined that the reductant solution is below the first threshold value (YES at 404) the method proceeds to 406 where the method includes transferring heat from an exhaust conduit to the reductant solution via a thermosyphon including an evaporator coupled the exhaust conduit, a condenser fluidly coupled to a return conduit positioned in the storage tank, and a fluidly isolated conduit in fluidic communication with the condenser and the evaporator.

Transferring heat from the exhaust conduit to the reductant solution via the thermosyphon includes at 408 transferring heat from the exhaust conduit to the evaporator in the thermosyphon. Transferring heat from the exhaust conduit to the reductant solution via the thermosyphon further includes at 410 flowing a working fluid through a fluidly isolated conduit in the thermosyphon in fluidic communication with the evaporator and a condenser in the thermosyphon. Transferring heat from the exhaust conduit to the reductant solution via the thermosyphon further includes at 412 transferring heat from the condenser in the thermosyphon to a portion of a return conduit positioned in the storage tank, the return conduit including an outlet within the storage tank.

At 414 it is determined if the reductant solution is greater than a second threshold temperature. In some examples, the first and second threshold temperatures are not equal. Specifically in one example, the first threshold temperature is 0 degrees Celsius and the second threshold temperature is 40 degrees Celsius. Furthermore, the second threshold temperature may be selected to reduce the likelihood of the reductant solution in the storage tank overheating, which may damage the system.

If it is determined that the temperature of the reductant solution is not greater than the second threshold temperature (NO at 414) the method returns to 414. However, if it is determined that the temperature of the reductant solution is greater than the second threshold temperature (YES at 414) the method includes at 416 discontinuing the steps of transferring heat from the exhaust conduit, flowing the working fluid through the fluidly isolated conduit, and transferring heat from the condenser to the portion of the return conduit. Next at 418 the method includes increasing the pressure in an injector fluidly coupled to a pump having a pick-up tube positioned in the storage tank. As previously discussed with regard to FIG. 1, the working fluid in the thermosyphon and the geometry of the thermosyphon may be selected to enable method 400 to be implemented via the thermosyphon. In this way, the thermosyphon is passively operated. As a result, the need for external control or powering of the thermosyphon is eliminated, thereby reducing the complexity and size of the reductant injection system.

The above described system and method provide the protection against precipitation and freezing of a liquid reductant solution in a storage tank. Furthermore, the liquid reductant injection system may include a reversible pump or a second pump, which directs reductant in an opposite direction relative to the pumping direction of the first pump, as described above. After the engine is turned off, the injector may be closed and the liquid reductant injection system subjected to pumping in the reverse direction. Additionally, the valve 137 may be used to purge the liquid reductant injection system. For example, valve 137, shown in FIG. 2, may be opened, the reductant injector 132 may be closed, and the pump 139 may be run in a reverse direction to draw air from the vapor space at the top of the storage tank 138. The injector 132 may be purged by closing valve 137, opening the injector 132, and running the pump 139 is a reverse direction to draw air from the exhaust conduit 112. Thus, the liquid reductant may be removed from the delivery line and the return line, preventing precipitation and/or freezing of reductant, which may otherwise cause clogging in the delivery line and the return line when the ambient temperature is below the precipitation or freezing points of the liquid reductant solution.

In addition to the liquid reductant having a reduced freezing point temperature, the above described system and method may have other advantages. For example, the power used by the reductant injection system may be reduced due to the use of the passive heating of the reductant via the thermosyphon when compared to other reductant injection systems that may heat the reductant via electrically powered heaters. In another example, the storage tank size may be reduced to a more useable volume due to use of less insulation in the storage tank walls and reduction of vapor space needed to accommodate reductant expansion during ice formation.

In yet another example, suppression of the liquid reductant freezing point temperature may result in the urea concentration value being independent from the freezing point. This may allow higher content of chemical reductant due to ability to operate with increased concentration of reductant for a given volume. A more useable volume may allow for extended driving distance between urea refills, reducing vehicle maintenance costs. In even another example, the more useable volume and/or higher concentration of reductant may allow for increasing the burden of NOx reduction on the exhaust aftertreatment system, while simultaneously reducing the burden of NOx reduction required from the engine combustion system. This may reduce the amount of exhaust gas recirulation, further improving vehicle fuel economy.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A liquid reductant injection system comprising:
a storage tank housing a reductant solution;
a reductant return conduit extending into the storage tank, the reductant return conduit including an outlet positioned in the storage tank; and
a thermosyphon comprising an evaporator coupled to an exhaust conduit and in fluidic communication with a condenser coupled to the reductant return conduit inside the storage tank, the condenser positioned vertically above the evaporator.

2. The liquid reductant injection system of claim 1, where the thermosyphon is a closed-loop passive thermosyphon including a fluidly isolated conduit in fluidic communication with the condenser and the evaporator.

3. The liquid reductant injection system of claim 1, where the reductant solution comprises urea, ethanol, and water, and where the reductant return conduit extends from a reductant injector to the storage tank.

4. The liquid reductant injection system of claim 1, further comprising a pump including a pick-up tube having an inlet opening into the storage tank, the pump in fluidic communication with the reductant return conduit.

5. The liquid reductant injection system of claim 4, where the inlet of the reductant return conduit is positioned downstream of the pump and upstream of a filter and a reductant injector.

6. The liquid reductant injection system of claim 5, where the pump is configured to circulate the reductant solution through the reductant return conduit when a temperature of the reductant solution falls below a lower threshold value.

7. The liquid reductant injection system of claim 1, wherein the thermosyphon is configured to transfer heat from the exhaust conduit to the reductant solution when a temperature of the reductant solution falls below a lower threshold value.

8. The liquid reductant injection system of claim 7, where the thermosyphon is configured to discontinue the transfer of heat from the exhaust conduit to the reductant solution when the temperature of the reductant solution exceeds an upper threshold value.

9. The liquid reductant injection system of claim 8, where a working fluid and a sizing of the thermosyphon are selected to enable the thermosyphon to transfer heat from the exhaust conduit to the reductant solution and discontinue the transfer of heat from the exhaust conduit to the reductant solution.

10. The liquid reductant injection system of claim 9, where the working fluid comprises at least one of water, ethanol, and acetone.

11. The liquid reductant injection system of claim 1, where the exhaust conduit is positioned upstream of an emission control device.

12. The liquid reductant injection system of claim 1, where the reductant return conduit includes a finned tube positioned upstream of the outlet and downstream of a location where the condenser is coupled to the reductant return conduit.

13. The liquid reductant injection system of claim 1, where the condenser is submerged in the reductant solution.

14. A method for operation of a liquid reductant injection system comprising:
storing a reductant solution in a storage tank; and
transferring heat from an exhaust conduit to the reductant solution via a thermosyphon including an evaporator coupled to the exhaust conduit, a condenser fluidly coupled to a reductant return conduit positioned in the storage tank, and a fluidly isolated conduit in fluidic communication with the condenser and the evaporator.

15. The method of claim 14, where transferring heat from the exhaust conduit to the reductant solution via the thermosyphon comprises:
transferring heat from the exhaust conduit to the evaporator in the thermosyphon;
flowing a working fluid through a fluidly isolated conduit in the thermosyphon in fluidic communication with the evaporator and a condenser in the thermosyphon; and
transferring heat from the condenser in the thermosyphon to a portion of the reductant return conduit positioned in a storage tank housing a reductant solution, the reductant return conduit including an outlet positioned within the storage tank.

16. The method of claim 15, where transferring heat from the exhaust conduit to the reductant solution via the thermosyphon comprises flowing reductant from a pump having a pick-up tube positioned in the storage tank to the outlet of the reductant return conduit.

17. The method of claim 15, where the steps of transferring heat from the exhaust conduit, flowing the working fluid through the fluidly isolated conduit, and transferring heat from the condenser are implemented during a first operating condition, the method further comprising during a second operating condition discontinuing the steps implemented during the first operating condition and increasing pressure in an injector fluidly coupled to a pump having a pick-up tube positioned in the storage tank.

18. The method of claim 17, where the steps of transferring heat from the exhaust conduit, flowing the working fluid through the fluidly isolated conduit, and transferring heat from the condenser are initiated when the reductant solution in the storage tank reaches a first threshold temperature and the step of increasing the pressure in the injector is implemented when the reductant solution in the storage tank is above a second threshold temperature.

19. The method of claim 14, where the condenser is positioned vertically above the evaporator.

20. A method for operation of a liquid reductant injection system comprising:
storing a reductant solution of ethanol, water, and urea in a storage tank;

when the reductant solution is below a first threshold temperature, transferring heat from an exhaust conduit to an evaporator in a thermosyphon, flowing a working fluid through a fluidly isolated conduit in the thermosyphon in fluidic communication with the evaporator and a condenser in the thermosyphon, and transferring heat from the condenser in the thermosyphon to a portion of a return conduit positioned in a storage tank housing a reductant solution, the return conduit including an outlet within the storage tank; and when the reductant solution is above a second threshold temperature, discontinuing the steps of transferring heat from the exhaust conduit, flowing the working fluid through the fluidly isolated conduit, and transferring heat from the condenser to the portion of the return conduit, and increasing pressure in an injector fluidly coupled to a pump having a pick-up tube positioned in the storage tank.

21. The method of claim 20, where the first and second threshold temperatures are not equal.

\* \* \* \* \*